United States Patent [19]

Schmitt et al.

[11] Patent Number: 4,859,013
[45] Date of Patent: Aug. 22, 1989

[54] MAGNETO-OPTICAL WAVEGUIDE DEVICE WITH ARTIFICIAL OPTICAL ANISOTROPY

[75] Inventors: Hans J. Schmitt; Günter L. Schmitz, both of Aachen; Hans Dammann, Tangstedt, all of Fed. Rep. of Germany

[73] Assignee: U.S. Philips Corp., New York, N.Y.

[21] Appl. No.: 104,586

[22] Filed: Oct. 2, 1987

Related U.S. Application Data

[63] Continuation of Ser. No. 671,148, Nov. 13, 1984, abandoned.

[30] Foreign Application Priority Data

Nov. 17, 1983 [DE] Fed. Rep. of Germany ....... 3341482

[51] Int. Cl.⁴ ................................................ G02B 6/10
[52] U.S. Cl. .............................. 350/96.12; 350/96.13
[58] Field of Search ........................... 350/96.12, 96.13

[56] References Cited

U.S. PATENT DOCUMENTS

| | | | |
|---|---|---|---|
| 4,032,216 | 6/1977 | Henry | 350/96.13 |
| 4,143,939 | 3/1979 | Desormiere et al. | 350/96.13 |
| 4,220,395 | 9/1980 | Wang et al. | 350/96.13 |
| 4,274,710 | 6/1981 | Nagao | 350/96.13 |
| 4,294,509 | 10/1981 | Nagao | 350/96.13 |

OTHER PUBLICATIONS

Iwamura et al; *Compact Optical Isolator;* Laser Focus; vol. 14, No. 11; Nov. 1978; p. 57.

Primary Examiner—William L. Sikes
Assistant Examiner—Robert E. Wise
Attorney, Agent, or Firm—Thomas A. Briody; Algy Tamoshunas; Leroy Eason

[57] ABSTRACT

A magneto-optical waveguide device for changing the radiation modes propagating in the structure comprises a magneto-optical layer in which the modes propagate and which is externally magnetized. This magneto-optical layer is carried by a substrate and is connected to an optically anisotropic structure. This optically anisotropic structure is an artificially formed phase structure having zones of different refractive indices, the zones and their distances from each other in the direction of propagation of the modes being small relative to the wavelength of the light.

14 Claims, 3 Drawing Sheets

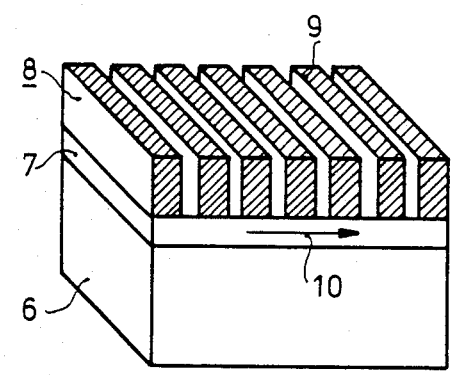
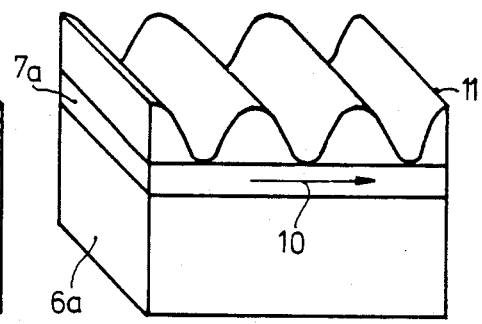
Fig. 2a  Fig. 2b
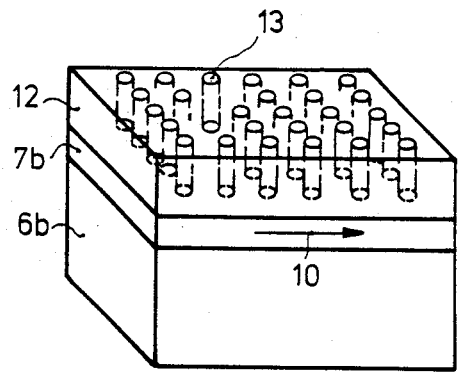
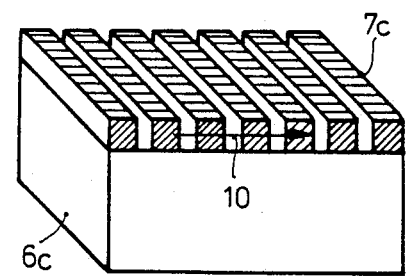
Fig. 2c  Fig. 2d
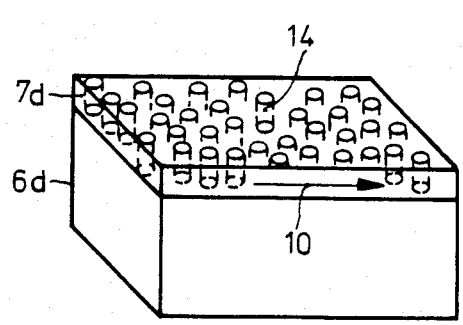
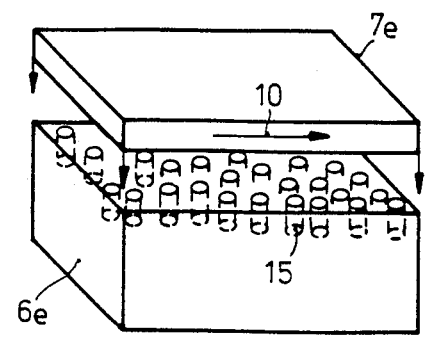
Fig. 2e  Fig. 2f

MAGNETO-OPTICAL WAVEGUIDE DEVICE WITH ARTIFICIAL OPTICAL ANISOTROPY

This application is a continuation of applications Ser. No. 671,148 filed Nov. 13, 1984, now abandoned.

BACKGROUND OF THE INVENTION

1. Field of the Invention

The invention relates to a magneto-optical waveguide device for the conversion of modes of propagation of the device, which device comprises a magneto-optical layer in which the radiation-modes propagate and which is magnetized externally, a substrate carrying the magneto-optical layer, and an optically anisotropic structure which extends parallel to the plane of said layer for phase adaptation of the radiation-modes in the case of total reflection from the boundary surfaces of the magneto-optical layer.

2. Description of the Prior Art

A waveguide device of this type is generally known. It serves to convert the various radiation-modes in the magneto-optical layer into each other (mode conversion). The fundamental modes are pure or at least substantially transverse magnetic (TM) and transverse electric (TE) waves, whose amplitudes are mathematically related through a scattering matrix. The radiation-modes are coupled by total reflection from the boundary surface of the magneto-optical layer and in the magneto-optical layer itself, which layer is magnetized in the direction of propagation of the modes. In order to obtain a satisfactory conversion of the wave modes into each other, a substantial number of reflections is required. However, a cumulative superposition demands specific phase relationships of the waves between the individual reflections, i.e. a substantially equal phase velocity of the TM waves and TE waves in the waveguide structure, which is also referred to as phase adaptation. Normally, this is not achieved if the waveguide is a purely gyrotropic dielectric film. In order to obtain phase adaptation, an additional optical anisotropy is required, for example an anisotropic top layer which affects the phase discontinuities of the modes in the case of total reflection from the boundary surfaces of the magneto-optical layer.

From the paper by S. T. Kirsch, J.Appl.Phys.52 (5), May 1981, pages 3190 to 3198, it is known to employ a single-crystal layer of lithium niobate ($LiNbO_3$) for such a optically anisotropic top layer. Such layers are deposited on the magneto-optical layer, which may for example consist of yttrium-iron garnet (YIG). However, because of the difference in lattice structure of the magneto-optical layer and top layer an intermediate layer, for example a selenium layer, must be interposed.

A waveguide device of this type therefore has a layer structure which is comparatively intricate and difficult to manufacture. As a result of the presence of the intermediate layer such devices are not suitable for industrial fabrication.

SUMMARY OF THE INVENTION

It is the object of the invention to provide a magneto-optical waveguide device for radiation-modes conversion which does not require the use of a single-crystal optically anisotropic top layer and intermediate layer.

To that end the magneto-optical waveguide device according to the invention has an optically anisotropic structure with artificially formed phase structure with zones of different refractive indices, and the zones and their distances from each other in the direction of propagation of the radiation-modes are small relative to the wavelength of the light.

Such artificially formed optically anisotropic phase structures have the advantage that the waveguide device can be provided with such structures in a simple manner. In this way intricate epitaxial-growth processes and complex technological steps are avoided.

In a very advantageous embodiment of the invention the phase structure is formed on that surface of the magneto-optical layer which faces the substrate. For this purpose a customary optically isotropic material may be deposited onto the magneto-optical layer by sputtering, spincoating, vacuum-deposition or another technology, after which the desired structure is formed.

In another very advantageous embodiment of the invention the magneto-optical layer itself constitutes the optically anisotropic phase structure. Thus, the additional optically anisotropic top layer may be dispensed with. For this purpose the magneto-optical layer is appropriately structured, i.e. it has several zones of different refractive indices.

In a further very advantageous embodiment of the invention the phase structure is formed in the substrate on the side which faces the magneto-optical layer. In this case the structure is formed almost exclusively on that surface area of the substrate on which the magneto-optical layer is situated. The substrate may then be structured before the magneto-optical layer is applied.

Further, it is possible to form a phase structure both on the magneto-optical layer and on the substrate. In addition, a top layer and the magneto-optical layer, or a top layer and the substrate may be formed with the structure. If desired, the top layer, the magneto-optical layer and the substrate may be formed with the structure.

Suitably, the relevant phase structure comprises zones formed by mask exposure and subsequent etching, preferably by exposure to X-rays or by bombardment with heavy ions. In this way it is possible to form phase structures having very small zones of different refractive indices. The zones should be very small relative to the wavelength of the light in the modes propagated by the structure.

It is obvious that the phase structures may alternatively be formed by bombardment of a suitable material with heavy ions without a subsequent etching process, because the zones which have been bombarded with heavy ions have a different refractive index than the zones of the material which has not been bombarded.

Preferably, the phase structure is constructed of a phase grating. The phase grating may have, for example, rectangular zones of different refractive indices, for example as described in Appl. Phys. Lett. 43 (6), 15 March 1983, pages 492 to 494. However, the phase grating may alternately have a trapezoidal, triangular or sinusoidal phase profile.

Suitably, the phase structure may be formed by statistically distributed nuclear-particle tracks. Such phase structures can be manufactured easily by irradiating the material with heavy ions.

The etched-away zones of the phase structure may be filled with a material whose refractive index differs from that of the phase-structure material, enabling a more accurate adaptation of the phase velocities of the modes which propagate in the structure.

The magneto-optical waveguide devices in accordance with the invention are suitable for the formation of optical isolators, circulators and switches. Recently, these devices command much interest in view of their use in optical data transmission by means of glass fibres. Isolators allow light to be transmitted in one direction only, the other direction being optically blocked. They are used specifically in order to protect a light source, for example a laser, against undesired reflections from the optical system connected to said source. Circulators are employed inter alia for isolating the transmit and receive lines of optical systems from each other, and optical switches serve, for example, for switching radiation which issues from an input port to various output ports depending on the switching state.

Embodiments of the invention will now be described in more detail, by way of example, with reference to the drawings.

BRIEF DESCRIPTION OF THE DRAWING

FIG. 2a to f show magneto-optical waveguide devices in accordance with the invention.

DESCRIPTION OF THE PREFERRED EMBODIMENTS

Figure 1:
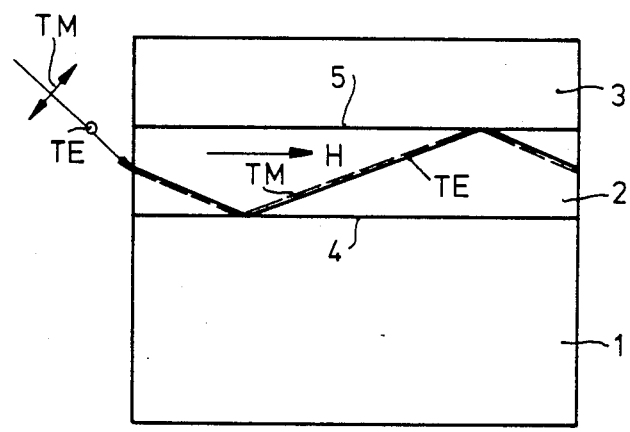
FIG. 1 shows the basic construction of a magneto-optical waveguide device.

Basically a magneto-optical waveguide device as shown in FIG. 1 comprises a substrate, for example a single-crystal gadolinium-gallium garnet (GGG) layer of 0.5 to 1 mm thickness. The substrate 1 carries a magneto-optical layer 2 of approximately 5 to 10/μm thickness, which layer is made of for example yttrium-iron garnet (YIG). The magneto-optical layer 2 carries a further layer 3, which extends parallel to the magneto-optical layer 2 and which has an optically anisotropic structure. The magneto-optical layer 2 has a refractive index which is higher than that of the substrate 1 and the optically anisotropic layer 3, so that under specific conditions radiation which propagates inside the magneto-optical layer 2 and in the plane of said layer is totally reflected from the boundary surfaces 4 and 5. A magnetic field H, which is preferably oriented in the direction of propagation of the radiation, extends inside the magneto-optical layer parallel to the plane of the layer, which field may be generated, for example, by means of an external magnet coil (not shown) which surrounds the waveguide device.

Such a waveguide structure is intended for mode conversion. FIG. 1 illustrates two fundamental modes TM and TE. The transverse electric mode vibrates perpendicularly to the plane of incidence of the radiation of the magneto-optical layer 2, whilst the transverse magnetic mode vibrates in the plane of incidence. In FIG. 1 the plane of incidence is the plane of drawing. The two modes TM and TE can be coupled to each other in the waveguide structure, as has been described comprehensively by, for example, Wang et al in J. Appl. Phys., Vol. 43, No. 4, April 1972, pages 1861 to 1875. The TE mode is then converted into the TM mode and vice versa. The two modes are converted and coupled after a multiplicity of total reflections of the modes from the boundary surfaces 4 and 5 of the magneto-optical layer 2. This requires a cumulative superposition of the two modes, which demands specific phase relationships between the individual reflections, or substantially equal phase velocities of the TE and Tm modes, i.e. a so-called phase adaptation. Such a phase adaptation is possible only by means of an optically anisotropic structure, for example and optically anisotropic top layer 3. If the phase adaption condition is that the total-reflection angles for the TE and TM modes should be equal is met, complete mode conversion in accordance with a specific path takes place. This means, for example, that the originally incident TE mode is shifted through 90° and now propagates further as a TM mode. Further, there are points in the waveguide structure by which a TE mode is for example first partly converted into a TM mode, i.e. part of its energy is initially transmitted in the TM mode. If originally only one TE mode has been set up in the magneto-optical layer 2 two TE-modes will propagate in this layer 2, whose directions of vibration are 90° shifted relative to each other and which have equal amplitudes. This yields a resultant wave whose direction of vibration is shifted through only 45° relative to the direction of vibration of the original TE mode.

It will be appreciated that the waveguide structure described above may be used for shifting the direction of vibration of the originally incident mode through a specific angle depending on the length of the structure. Thus, waveguide structures of this type are very suitable for use as optical isolators, optical circulators and optical switches. Such waveguide structures are particularly suitable for the construction of integrated planar isolators, circulators, and switches.

According to the invention the optically anisotropic structure need not necessarily be arranged exclusively on the magneto-optical layer 2. Alternatively this optically anisotropic structure may be situated inside the magneto-optical layer 2 or inside the substrate 1, namely its side which faces the magneto-optical layer 2. In addition, it has been found that a plurality of the said layers 1 to 3 may be provided with optically anisotropic structures. In this respect optically anisotropic is to be understood to mean that the refractive index for TE-modes differs from the refractive index for TM modes.

FIGS. 2a to f show different waveguide devices in accordance with the invention. In FIG. 2a the waveguide device comprises a substrate 6 carrying a magneto-optical layer 7. An optically anisotropic phase structure in the form of a phase grating 8 is situated on top of the magneto-optical layer 7. The phase grating 8 comprises separate grating bars 9 which have rectangular cross-sections in the longitudinal direction and which preferably extend perpendicularly to the direction 10 of propagation of the mode inside the magneto-optical layer 7. The dimensions of the grating bars 9 in the direction 10 of the propagation of the modes and the grating period in this direction 10 are very small relative to the wavelength of the light which is used.

Viewed in the longitudinal direction the grating bars 9 may have cross-sections other than rectangular. For example, they may be triangular or trapezoidal (not shown). However, alternatively, as is shown in FIG. 2b, the phase structure may be formed as a sinusoidal grating 11, which in the same way as the phase grating 8 is arranged on a magneto-optical layer 7a deposited on a substrate 6a.

Both the plane grating 8 and the phase grating 11 can be manufactured by providing the magneto-optical layer 7 or 7a with an optically isotropic material, for example silicon dioxide, PMMA (polymethyl methacrylate), a photoresit, or a similar material by sputtering or spincoating, which material is subsequently exposed and etched away in a suitable manner. Preferably, the material is exposed to X-rays or it is bombarded with heavy ions, because this enables grating structures which are very small relative to the wavelength of the lift to be formed.

FIG. 2c shows a further waveguide device comprising a substrate 6b and a magneto-optical layer 7b, in which the optically anisotropic phase structure comprises a plate 12 in which cylindrical portions 13 are formed whose refractive index differs from that of the plate 12. The cylindrical portions 13 preferably extend perpendicularly to the plate 12 which carries the magneto-optical layer 7b. These portions are arranged as, for example, rows which are situated after each other in the direction 10 of propagation, the direction of the rows extending perpendicularly to the direction 10 of propagation. However, they may also be arranged in accordance with a different pattern. This results in a structure resembling that of a phase grating, which also exhibits the desired optical anisotropy. The diameters of the portions 13 and their distances relative to each other in the direction 10 of propagation of the modes are then small relative to the wavelength of the light in the modes.

The cylindrical portions 13 inside the plate 12 may be formed for example by bombarding the plate 12, which is made of a suitable material, with heavy ions. These portions which have been irradiated with heavy ions may be etched additionally, so that hollow cylindrical portions 13 are formed.

FIG. 2d shows a waveguide structure whose substrate 6c only carries a magneto-optical layer 7c which has not been provided with a further top layer. The magneto-optical layer 7c may have the same structure as the phase gratings 8 and 11 in FIGS. 2a and 2b, respectively.

A similar waveguide structure is shown in FIG. 2e. However, in this case the magneto-optical layer 7d on the substrate 6d has a different structure. It comprises cylindrical portions 14 which preferably extend perpendicularly to the plane of the magneto-optical layer 7d and which are statistically distributed in this layer. The diameters of the cylindrical portions 14 and their distances relative to each other in the direction 10 of propagation of the modes are small relative to the wavelength of the light. Again the cylindrical portions 14 may be formed by nuclear-particle tracks obtained by, for example, bombardment with heavy ions, or by hollow cylindrical holes formed by etching the nuclear-particle tracks.

Another possibility of providing a waveguide device with an optically anisotropic structure is shown in FIG. 2f. In this case the surface layer of the substrate 6e which faces the magneto-optical layer 7e has been formed with the structure. For the sake of clarity the magneto-optical layer 7e, which is situated on the substrate 6e, is shown spaced from this substrate. The substrate layer, whose magneto-optical layer 7d may be the same as that described with reference to FIG. 2e, has now been provided with statistically distributed cylindrical portions 15 in order to obtain the optically anisotropic properties of the surface of the substrate 6e. It is obvious that the cylindrical portions need not be oriented perpendicularly to the surface of the substrate layer 6e. In the same way as the cylindrical portions 13 and 14 in FIG. 2c and 2e, they may extend obliquely relative to the surface of the relevant layer. In addition, the etched-away zones may be filled with an additional material in all the phase structures 2a to 2f, which material has a refractive index which differs from that of the original material.

Alternatively, the substrate side which faces the magneto-optical layer may be given a sinusoidal, stepped or sawtooth-shape. The side of the magneto-optical layer which faces the substrate is then given a corresponding shape, so that the two layers are each other's complement.

Figure 3A:
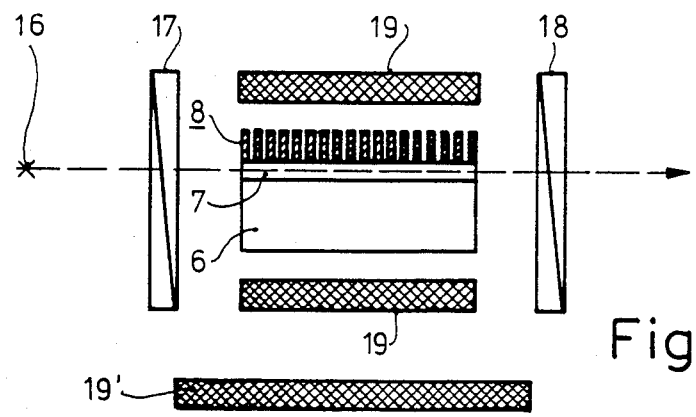
FIG. 3a shows an optical isolator.

FIG. 3 shows an example of an optical isolator comprising a waveguide device in accordance with the invention. In the optical isolator light from a light source 16 traverses two polarizers 17 and 18 which are arranged at 45° relative to each other and between which a waveguide device as shown in FIG. 2a is arranged. This waveguide device is surrounded by a magnetizing device 19, which generates a magnetic field which extends parallel to the magneto-optical layer 7 and which magnetically saturates the layer 7. The magnetizing device 19 may be, for example, a permanent magnet or an electromagnet.

In the optical isolater the light which issues from the light source 16 is polarized by the polarizer 17. Through mode conversion the plane of polarization of the light which propagates in the magneto-optical layer 7 is rotated through 45°, so that it can pass through the polarizer 18 which has been set to this angle. The plane of polarization of the light which is subsequently reflected from the following optical system is rotated through −45° by the waveguide device, so that this light images on the polarizer 17 in the blocking direction. In this way the light source is optically isolated from the optical system connected to this source.

The light source 16 may be, for example, a semiconductor laser which is arranged directly against a lateral surface of the magneto-optical layer. The polarizer 17 may then be dispensed with, because the semiconductor laser already emits linearly polarized light.

If the isolater is to be used separately, it may be arranged for example inside an optical connector, thus enabling optical paths, for example optical fibre guides, to be isolated in a simple manner.

Figure 3B:
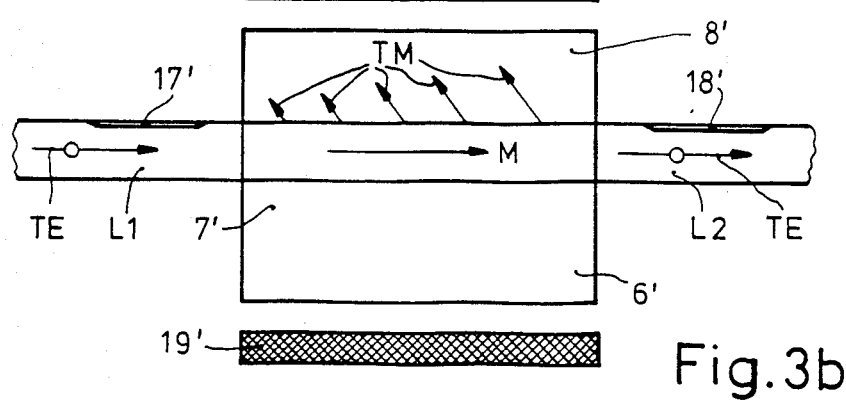
FIG. 3b shows an optical isolator in integrated technology.

FIG. 3b shows a further optical isolator in integrated technology. Here, the light is coupled into and out of the magneto-optical waveguide device 7' via optical fibre guides L1, L2, which device comprises a substrate 6' and an optically anisotropic top layer 6' and an optically anisotropic top layer 8'. The optical fibre guides L1, L2 are optically cemented to the waveguide device 7'. The waveguide device 7' is one-dimensional and has a structure which enables the light to be coupled in and out.

In accordance with generally known techniques the light polarizers 17', 18' may be formed directly in the optical fibre guides $L_1$ and $L_2$, before and after he magneto-optical layer 7', respectively, in that the optical fibre guides $L_1$, $L_2$ are ground laterally and the ground surfaces are provided with a combination of a dielectric and a conductive layer.

The entire device is surrounded by a magnetic-field device 19' for generating a magnetic field M which is preferably oriented in the direction of propagation of the light.

In accordance with the proposal by S. Yamamoto, IEEE Journal of Quantum Electronics, QE 12 (1976) 764, the optical isolator of FIG. 3b utilizes the fact that in the case of a suitable orientation of the optical anisotropy the mode conversions as a result of the non-reciprocal Faraday-effect and the optical anisotropy for one mode and one direction of propagation (the TE mode which propagates from left or right in FIG. 3b) compensate for each other and augment each other in opposite direction (from right to left in FIG. 3b). Thus, for a wave which travels backwards (from right to left in FIG. 3b) this means that a continuous mode conversion from TE to TM is effected.

If the suitable values for the optical anisotropy, i.e. for the various refractive indices, have been selected, it is also possible to achieve that the returning TM wave formed by mode conversion no longer propagates in the layer 7', but "leaks" into the top layer 8' as a result of the large difference in refractive index (leakage mode). In such a case the polarizer 17' on the input side may also be dispensed with.

Figure 4:
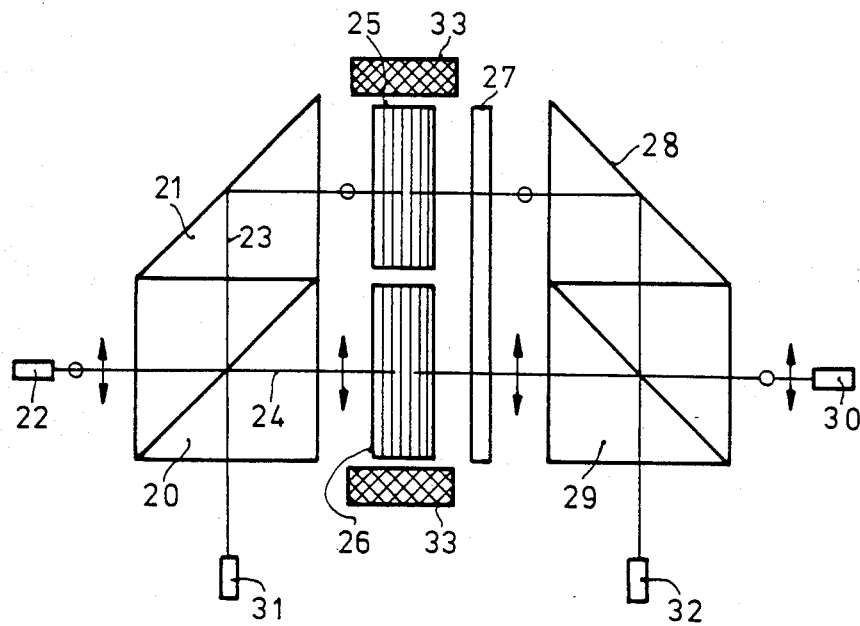
FIG. 4 shows an optical circulator.

FIG. 4 shows an optical circulator equipped with two waveguide devices as described with reference to FIGS. 1 and 2. Circulators are employed in optical datatransmission systems for isolating the transmit and receive lines from each other. Since in general datatransmission systems, or fibre-optic systems do not maintain the state of polarization of the light, the circulators must be suitable for operation with non-polarized light.

Therefore, the optical circulator comprises a first polarization splitter 20 and a first deflection prism 21 for splitting the light received from a port 22 into two beams 23 and 24 which are polarized perpendicularly to each other, which is indicated by the symbols in the radiation path. The planes of polarization of these two beams 23 and 24 are then rotated through 45° each in the waveguide devices 25, 25. A following half-way plate 27 is arranged so as to cancel this rotation. In order to recombine the two beams 23 and 24 use is made of a second deflection prism 28 and a second polarization splitter 29, so that the light from the port 22 can pass through the port 30. In the present example the optical ports are formed by the end faces of the optical fibre guides. It is obvious that these ports may comprise other elements which are capable of receiving optical radiation.

However, if light from port 30 is fed into the optical circulator, the two rotations of the plane of polarization of the radiation beam 23 and 24 of the radiation beam are added to each other, giving a total rotation of 90°, so that the light from port 30 can reach port 31. In a similar way, the light from port 31 is coupled to port 32 and from port 32 back to port 22. There is provided a magnetic-field device 33, which generates a stationary magnetic field in parallel with the plane of the magneto-optical layers of the waveguide devices and in the direction of propagation of the light for saturating the magneto-optical layers.

Figure 5:
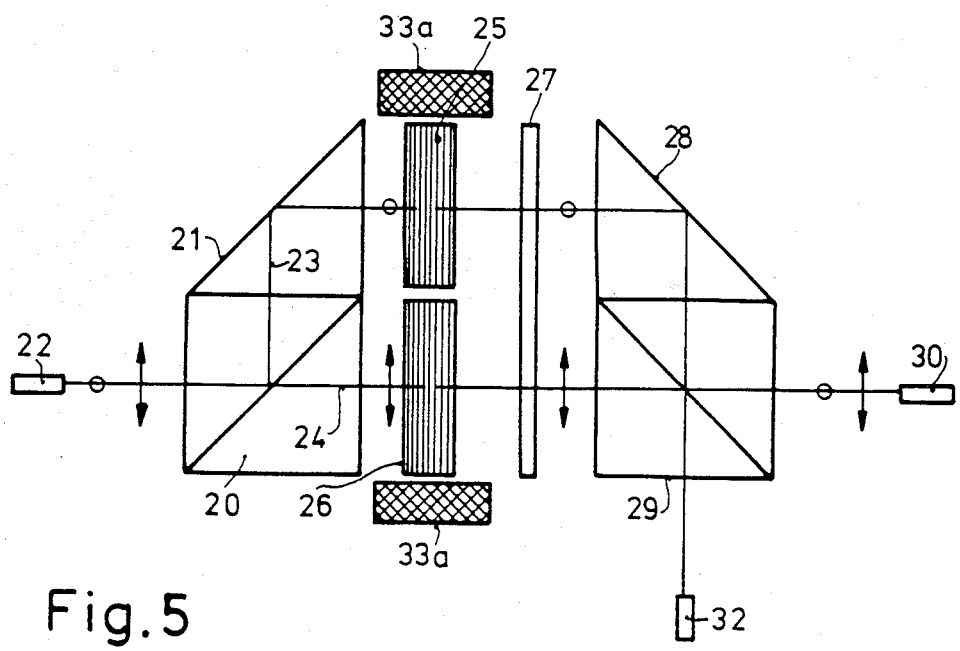
FIG. 5 shows an optical switch employing waveguide devices in accordance with the invention.

The optical switch shown in FIG. 5 has a construction similar to that of the circulator shown in FIG. 4. In this switch the port 31 has been dispensed with, whilst the port 22 only serves an input port for the light to be coupled into the output ports 30 and 32. Into which of these output ports 30 and 32 the radiation is coupled depends on the magnetic switching state of the magnetic-field device 33a. Depending on whether the magnetization within the magneto-optical layers of the waveguide devices extends in or opposite to the beams direction, the radiation is routed to the one or the other output port. The magnetization of the magneto-optical layers is provided by the switchable magnetic-field device 33a, which is constructed as a coil through which a current can be passed whose direction can be reversed.

What is claimed is:

1. A magneto-optical waveguide for mode conversion of waves traveling therein, said waves having a predetermined wavelength, comprising:
   a substrate;
   an externally magnetized magneto-optical layer on said substrate for propagating said waves, said magneto-optical layer having reflecting boundary surfaces which form multiple total reflections of said waves therefrom, such total reflections effecting a mode conversion of said waves; and
   an optically anistropic structure extending in the direction parallel to said layer for phase matching of the mode converted waves formed at said boundary surfaces, said optically anisotropic structure having an artificially manufactured phase structure with successive regions which have alternately different indices of refraction in the direction of propagation of said waves, and wherein the lengths of said regions and the distances therebetween in the direction of propagation of said waves are less than the wavelength of said waves.

2. A waveguide structure as claimed in claim 1, wherein said phase structure is formed on that surface of the magneto-optical layer which is opposite the substrate.

3. A waveguide as claimed in claim 2, wherein zones are rectangular, triangular or sinusoidal.

4. A waveguide as set forth in claim 2, wherein said phase structure is created by radiation through a mask and subsequent etching.

5. A waveguide as set forth in claim 2, wherein said phase structure has regions created by heavy ion bombardment.

6. A waveguide as claimed in claim 1 wherein said magneto-optical layer further constitutes said optically anisotropic phase structure.

7. A waveguide as claimed in claim 1, wherein said phase structure is a phase grating.

8. A waveguide structure as claimed in claim 1, wherein said phase structure is constituted by statistically distributed nuclear-particle tracks.

9. A waveguide as claimed in claim 1, wherein said phase structure is formed on said substrate on the side facing said magneto-optical layer.

10. An optical isolator comprising a first and second polarizer rotated 45° relative to one another, and means interposed between said polarizers for rotating the plane of polarization of linearly polarized light propagated therebetween wherein said means for rotating the plane of polarization comprises:
   a substrate;
   an externally magnetized magneto-optical layer on said substrate for propagating said waves, said magneto-optical layer having reflecting boundary surfaces which form multiple total reflections of said waves therefrom, such total reflections effecting a mode conversion of said waves;

and an optically anisotropic structure extending in the direction parallel to said layer for phase matching of the mode converted waves formed at said boundary surfaces, said optically anisotropic structure having an artificially manufactured phase structure with successive regions which have alternately different indices of refraction in the direction of propagation of said waves, and wherein the lengths of said regions and the distances therebetween in the direction of propagation of said waves are less than the wavelength of said waves.

11. A waveguide as set forth in claim 10, wherein said radiation is X-ray radiation.

12. A waveguide as set forth in claim 10, wherein etched regions of said phase structure are filled with a material having an index of refraction different from the index of refraction of said phase structure.

13. An optical circulator comprising a first and second optical unit, each of said units comprising a polarization-sensitive beam splitting device and a beam deflecting device and means arranged between said first and second units for rotating the plane of polarization of linearly polarized light propagated therebetween; wherein said polarization rotating means comprises;
   a substrate;
   an externally magnetized magneto-optical layer on said substrate for propagating said waves, said magneto-optical layer having reflecting boundary surfaces which form multiple total reflections of said waves therefrom, such total reflections effecting a mode conversion of said waves; and
   an optically anisotropic structure extending in the direction parallel to said layer for phase matching of the mode converted waves formed at said boundary surfaces, said optically anisotropic structure having an artificially manufactured phase structure with successive regions which have alternately different indices of refraction in the direction of propagation of said waves, and wherein the lengths of said regions and the distances therebetween in the direction of propagation of said waves are less than the wavelength of said waves.

14. An optical switch comprising a first and second optical unit, each of said units comprising a polarization-sensitive beam splitting device and a light beam deflection device, and means arranged between said first and second units for rotating the polarization plane of linearly polarized light propagated therebetween; wherein said polarization rotating means comprises:
   a substrate;
   an externally magnetized magneto-optical layer on said substrate for propagating said waves, said magneto-optical layer having reflecting boundary surfaces which form multiple total reflections of said waves therefrom, such total reflections effecting a mode conversion of said waves;
   and an optically anisotropic structure extending in the direction parallel to said layer for phase matching of the mode converted waves formed at said boundary surfaces, said optically anisotropic structure having an artificially manufactured phase structure with successive regions which have alternately different indices of refraction in the direction of propagation of said waves, and wherein the lengths of said regions and the distances therebetween in the direction of propagation of said waves are less than the wavelength of said waves;
   and wherein said optical switch further comprises magnetizing means surrounding said polarization rotating means for generating a magnetic field alternately in the same direction and in the opposite direction relative to said direction of propagation of said waves.

* * * * *